UNITED STATES PATENT OFFICE.

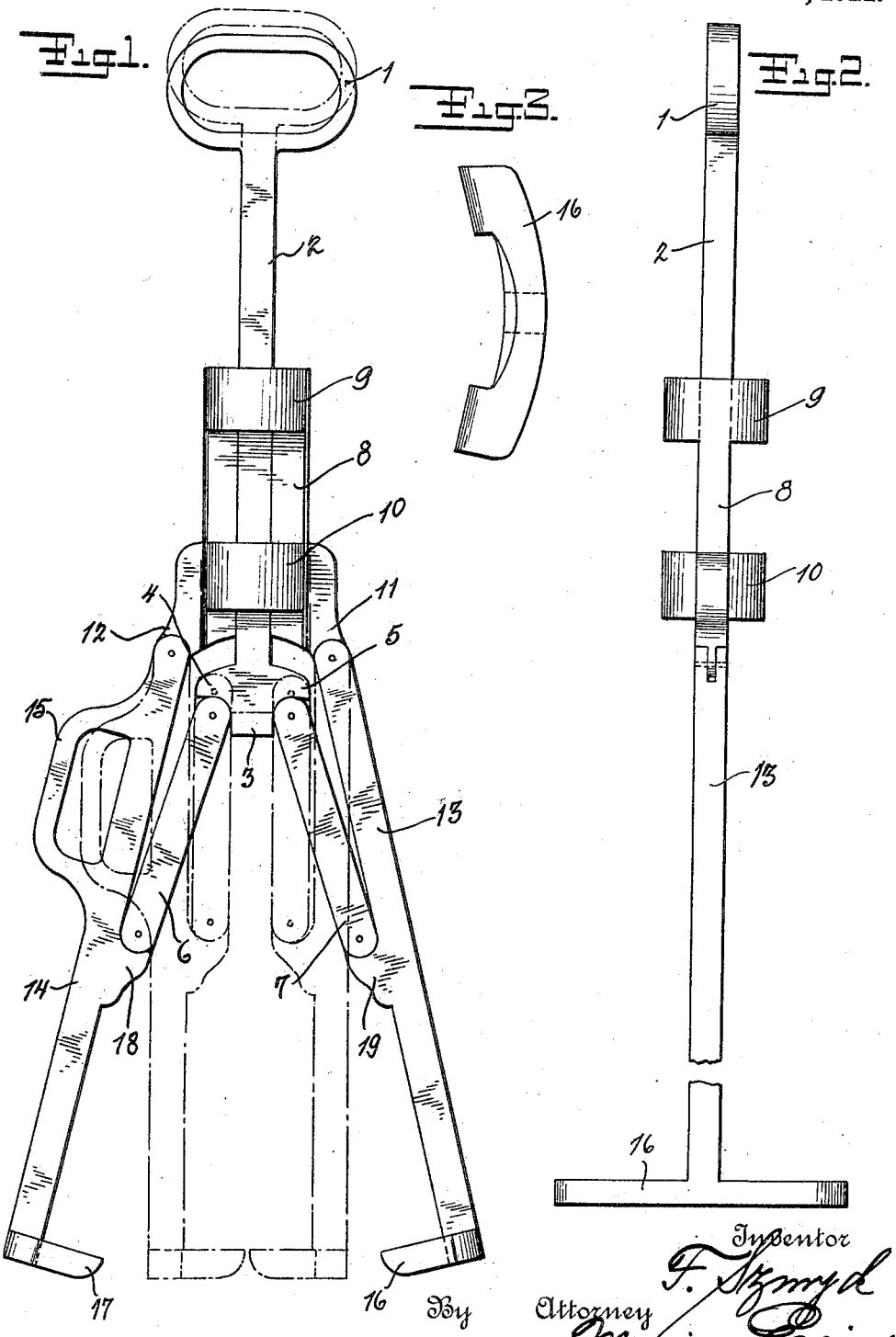

FRANK SZMYD, OF WALTERSBURG, PENNSYLVANIA.

UTENSIL IMPLEMENT.

1,397,345.  Specification of Letters Patent.  Patented Nov. 15, 1921.

Application filed August 6, 1920. Serial No. 401,695.

*To all whom it may concern:*

Be it known that I, FRANK SZMYD, a citizen of Poland, residing at Waltersburg, in the county of Fayette and State of Pennsylvania, have invented certain new and useful Improvements in Utensil Implements, of which the following is a specification.

The main object of this invention is the provision of an implement for carrying about cooking pots and kettles, thereby eliminating the inconvenience and danger associated with carrying such utensils in the hands.

The above and other objects will become apparent in the description below, in which characters of reference refer to like-named parts in the drawings.

Referring briefly to the drawings, Figure 1 is a front elevational view of the device, the same being shown in extended position in heavy lines, and in retracted position in dotted lines.

Fig. 2 is a side elevational view of the same.

Fig. 3 is a detail view of one of the gripping elements.

Referring now in detail to the drawings, the numeral 1 represents the handle of the device, attached to a rectangular stem 2 having ears 4 and 5 at its lower extremity, and a stop or buffer 3 between the ears. Links 6 and 7 are pivotally attached to the ears 4 and 5, respectively.

A flattened sleeve 8 having hubs 9 and 10 at its ends surrounds the stem 2, the latter being slidable within the sleeve. Ears 11 and 12 extend from the lower hub 10, and members 13 and 14, respectively, are pivotally attached thereto. On the inner sides of the last-named members additional ears 18 and 19 are provided, and to them are pivoted the ends of the links 6 and 7, respectively. A hand grip 15 is provided on the member 14. At the lower extremities of the members 13 and 14 are jaws 16 and 17, preferably of rubber.

In use, the sleeve 8 is moved all the way down against the ears 4 and 5, causing the jaws to separate, and the latter are then placed about opposite edges of the kettle or pot to be lifted. Then the sleeve 8 is raised toward the handle 1, closing the jaws about the utensil. By placing the handle 1 in the palm of the hand, and gripping the sleeve 8 and hub 9 in the fingers, the pot may be carried in one hand.

I claim:

A lifter comprising a handle, a rectangular bar extending therefrom, a pair of opposed lugs formed with the opposite end of said bar, a slide mounted on said bar between said handle and the lugs, lateral projections on said slide in register with said lugs, arms pivoted to said projections, clamp members at the free ends of said arms, projections on the adjacent sides of said arms, links pivoted at their respective ends to said lugs and the arm projections and a handle grip formed with one of said arms whereby they may be actuated.

In testimony whereof I affix my signature.

FRANK SZMYD.